(12) United States Patent
Achimon

(10) Patent No.: US 9,383,058 B1
(45) Date of Patent: Jul. 5, 2016

(54) TEMPORARY MOUNTING DEVICE FOR EXISTING GADGETS

(71) Applicant: Larry Don Achimon, Tom Bean, TX (US)

(72) Inventor: Larry Don Achimon, Tom Bean, TX (US)

(*) Notice: Subject to any disclaimer, the term of this patent is extended or adjusted under 35 U.S.C. 154(b) by 70 days.

(21) Appl. No.: 13/904,476

(22) Filed: May 29, 2013

(51) Int. Cl.
*B60P 7/08* (2006.01)
*F16M 13/02* (2006.01)

(52) U.S. Cl.
CPC .............. *F16M 13/02* (2013.01); *B60P 7/0823* (2013.01)

(58) Field of Classification Search
USPC ............. 248/219.4, 219.3, 219.1, 218.4, 499, 248/500, 505; 24/71.1, 68 CD, 68 F, 68 PP, 24/68 FP, 71 TD, 69 CT, 68 R, 265 R, 24/265 CD, 265 AL; 42/106
See application file for complete search history.

(56) References Cited

U.S. PATENT DOCUMENTS

| | | | | |
|---|---|---|---|---|
| 3,468,567 A * | 9/1969 | Henry et al. | ................... | 403/395 |
| 3,564,743 A * | 2/1971 | Gilmoure | ........................ | 40/604 |
| 4,548,377 A * | 10/1985 | Huel | ........................... | 248/219.1 |
| 6,059,240 A * | 5/2000 | Gorsuch | .................... | 248/219.4 |
| 6,715,585 B1 * | 4/2004 | Overbaugh | ................... | 182/187 |
| 8,469,206 B2 * | 6/2013 | Wilson | .......................... | 211/100 |
| 2004/0195478 A1* | 10/2004 | Baldasari | .................... | 248/218.4 |
| 2009/0230266 A1* | 9/2009 | Hillstrom et al. | .......... | 248/230.9 |
| 2010/0102184 A1* | 4/2010 | Gorsuch et al. | ............ | 248/218.4 |
| 2011/0049315 A1* | 3/2011 | Buckbee | .................... | 248/219.4 |

* cited by examiner

*Primary Examiner* — Alfred J Wujciak
(74) *Attorney, Agent, or Firm* — Grady K. Bergen; Griggs Bergen LLP

(57) ABSTRACT

A device for mounting existing gadgets temporarily to various small, vertical structures, comprising of a spring steel main stem, with a v-mount attached to both ends of main stem for support against chosen structure. There are mounting stems attached to these ends, and a strap which is utilized in the center of the main stem that transfers tension from device to chosen structure at the contact points, while providing the ability to attach up to two existing gadgets directly to device via the mounting stems.

20 Claims, 2 Drawing Sheets

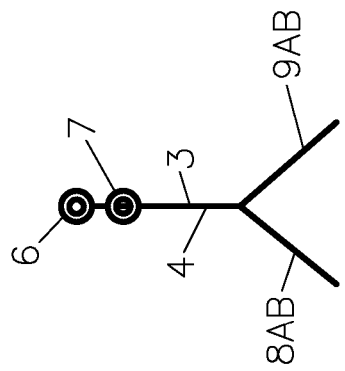
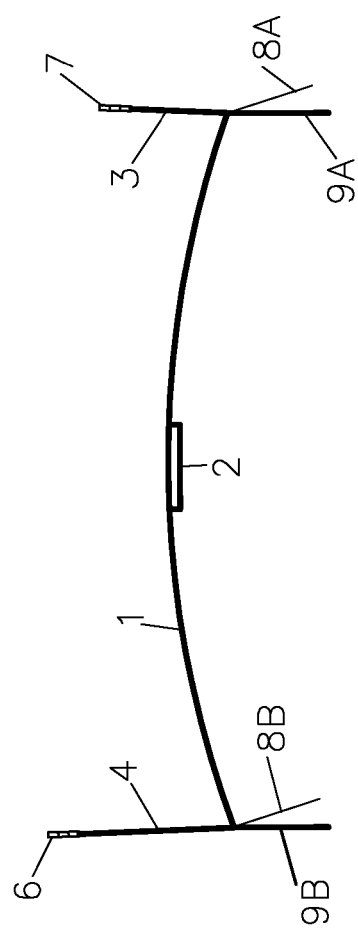

TEMPORARY MOUNTING DEVICE FOR EXISTING GADGETS

BACKGROUND OF THE INVENTION

Field of the Invention

The present invention relates to a device for attaching various existing devices (such as fishing rod holders) to a pole, dock, tree or the like.

The current state of knowledge is as follows. The ability to mount equipment on a pole, dock or tree, such as a fishing rod holder, can be very difficult due to the nature of the attachment, and the diameter of the pole may vary from one location to another. Currently, specialized brackets are needed to fit specific diameters of poles or docks, and these devices require a permanent mounting process.

Many current methods of attaching existing devices to support structures (e.g. trees, docks, poles, bridges, or posts) also must be bolted, drilled or tied with more than temporary means in order to ensure stability. These methods possibly damage the chosen structure or the gadget itself, and will not be as stable or as durable to withstand repeated uses within harsh and weathered environments. Other devices, such as a similar patented mounting bracket (U.S. Pat. No. 5,632,461), do not provide durability or stability, or the ability to attach more than one device at a time.

For the reasons stated above and for other reasons stated below, there is a need for a mounting device that can be used with different diameter poles and is capable of retaining more than one small device, that is simple to mount, simple to remove and does not damage the surface to which it is attached.

Accordingly, it is an object of the present invention to provide a device for temporarily attaching other devices, which can be used with multiple types of vertical or horizontal structures, such as a poles or trees.

It is a further object of the present invention to provide such a device that can be quickly and easily mounted to the pole or column.

It is a still further object of the present invention to provide such a device that is relatively light weight, and made with durable but cost-effective material.

BRIEF SUMMARY OF THE INVENTION

In accordance with these and other objects, a mounting device is provided for securing existing equipment to a vertical structure, such as trees, bridges, docks or posts. In its preferred embodiment, the mounting device comprises a spring steel main stem with a v-mount attached to both ends of main stem for support against the chosen structure. Two mounting stems of different lengths are attached to either end of the main stem, facing outward from the v-mounts, in order to accommodate the existing gadgets and to provide clearance from the bottom mount to the top mount. A strap is attached to the center of the main stem that transfers tension from device to chosen structure at the four contact points, while providing the ability to attach up to two existing gadgets via the mounting stems.

The present invention also provides a strap that can be secured to virtually any vertical structure with a small diameter, such as a post, dock, tree or column. The device can be quickly and easily mounted to the structure by placing the v-mount side of the main stem against the structure, extending the strap around the structure, securing the strap to the buckle, and tensioning the strap. Additionally, the device is durable, lightweight, and strong since it is constructed with stainless spring steel as the material.

BRIEF DESCRIPTION OF THE DRAWINGS

The present invention can be more easily understood and further advantages and uses thereof more readily apparent, when considered in view of the detailed description and the following figures in which:

FIG. 1 is a side horizontal perspective view of a mounting device of one embodiment of the present invention;

FIG. 2 is a bottom perspective view of a mounting device of one embodiment of the present invention;

In accordance with common practice, the various described features are not drawn to scale but are drawn to emphasize specific features relevant to the present invention. Reference numbers denote similar elements throughout figures and text.

DETAILED DESCRIPTION OF THE INVENTION

Figure 5:
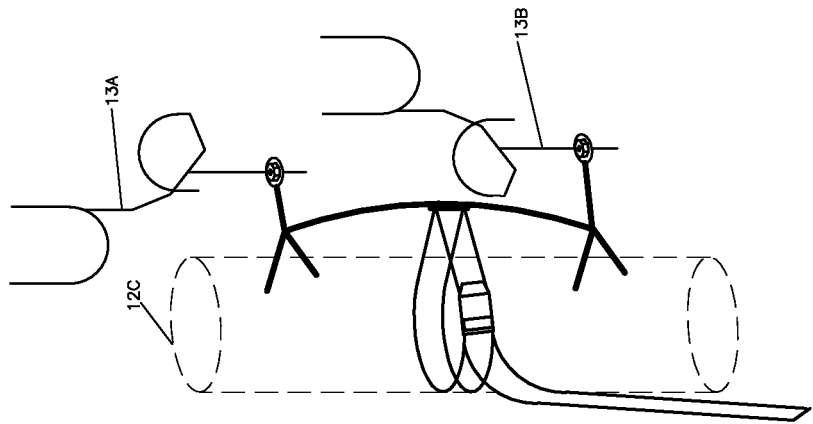
FIG. 5 is a side perspective view of a mounting device of one embodiment of the present invention mounting a device to a round pole with an example of fishing rod holders bolted to a device.

Referring to the drawings, more particularly by reference character:

The primary objective of the temporary mounting device is to provide a mechanism for securing existing fishing rod holders to vertical structures, such as trees, poles, and bridges, without having to use ad hoc tools or permanent means. In a preferred embodiment, the mounting device comprises a slightly curved stainless spring steel main stem, v-mounts on either end of the stem to fit against the surface of the structure and stem mounts protruding outwards from the v-mounts and structure. In a preferred embodiment, the stainless spring steel would be 5/16" to 3/8" in diameter. In a more preferred embodiment, the stainless spring steel would be 5/16" in diameter.

In a preferred embodiment, in FIG. 1 the body of the mounting device 1 is approximately 12" to 16" in height and approximately 4.5" to 7.5" in width. In a more preferred embodiment, the body of the mounting device is approximately 13.5" to 14.5" in height and approximately 5" to 7" in width. The preferred embodiment was determined for optimal strength and size ratio, according to the material, stability, and durability possible for such a device and its uses.

In a preferred embodiment, in FIG. 1 the main stem 1 is formed at an approximate radius of 10" to 26". In a more preferred embodiment, the main stem is formed at an approximate radius of 15" to 21".

On either end of the main stem, the v-mounts, FIGS. 1, 8 AB & 9 AB, are attached at an angle extending inward toward the inward face of the main stem 1 radius, at more than 90 degrees. In a preferred embodiment the angle of each v-mount in relation to the main stem radius is 91 degree to 110 degree. In a more preferred embodiment, the angle of each v-mount in relation to the main stem radius is 95 degree to 105 degree. The two v-mounts, AB & 9 AB, in relation to the chosen support structure, provide maximum amount of stability vertically and horizontally utilizing tension and the contact points.

FIG. 2 shows the angle of the v-mount itself, 8 AB & 9 AB, is less than 90 degrees. In a preferred embodiment the angle of either v-mount is 65 degree to 89 degree. In a more preferred embodiment, the angle of either v-mount is 75 degree to 85 degree. The less-than 90 degree angle of the v-mount allows for a wider range of contact on smaller diameter structures, including round or square shaped structures.

Figure 4:
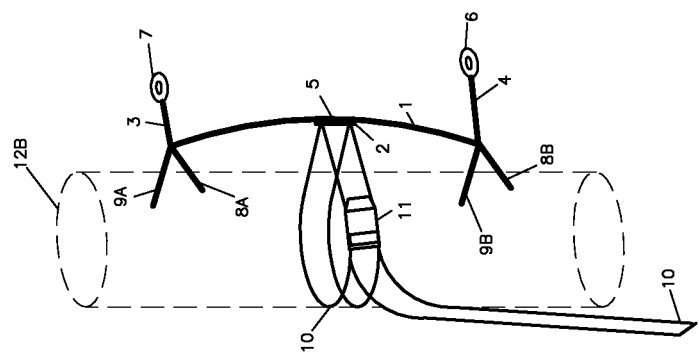
FIG. 4 is a side perspective view of a mounting device of one embodiment of the present invention mounting a device to a round pole.
Figure 3:
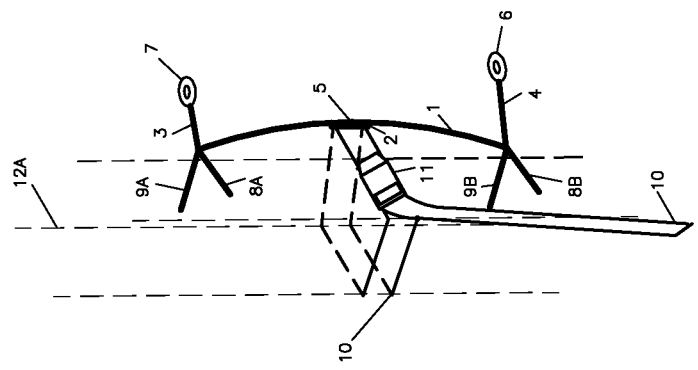
FIG. 3 is a side perspective view of a mounting device of one embodiment of the present invention mounting a device to square tubing.

As shown in FIGS. 3 & 4, the curved main stem 1 is attached to the structure via strap 10, with the inward side of the curve facing towards the structure. As the strap is tightened at the securing device 11, the main stem produces tension and the radius of the main stem 5 is slightly increased, which transfers the tension to each end of the stem onto the v-mount 8 AB & 9 AB contact points to the structure.

As shown in FIG. 1, the center of the main stem 1, attachment point 2 comprises a loop attachment of 0.25" to 2" in length attached to the inside of the radius of the main stem 5. In a more preferred embodiment, the attachment point is 0.5" to 1.5" in length.

As shown in FIGS. 1 & 2, a preferred embodiment includes mounting stems 3 & 4 in lengths of 1" to 6". In a more preferred, embodiment the mounting stems would be 2" to 4" in length and would be unequal in length in order to accommodate two gadgets or fishing rod holders without interfering with each gadget.

As shown in FIG. 1, the mounting stems 3 & 4 are attached between 60 degree to 90 degree, in relation to main stem 1. In a preferred embodiment, the mounting stems are attached between 75 degree to 85 degree, in relation to main stem 1.

As shown in FIGS. 1 & 2, the mounting stems 3 & 4 further comprise a mounting plate 6 & 7 between 0.625" to 0.75" in diameter, with a hole to accommodate bolts between 0.3125" to 0.375" diameter. These sizes are chosen in order to accommodate the widest range of existing gadgets and devices.

According to FIGS. 3 & 4, a mounting strap 10 comprise of a means for securing the temporary mounting device to a structure utilizing sufficient materials, such as webbing, and a securing device 11, which is permanently attached at one end of the material and looped through the other end of the securing device, so as to provide the ability to increase tension against the chosen structure. In a preferred embodiment, the mounting strap would pass through the mounting stem 2 and around the chosen structure to attach via self-buckling and tensioning device.

FIG. 3 is a line drawing evidencing a side view of the temporary mounting device with strap 10 and securing device 11 attached to square shaped tubing 12 A.

FIG. 4 is a line drawing evidencing a side view of the temporary mounting device with strap 10 and securing device 11 attached to cylindrical tubing 12 B.

FIG. 5 is a line drawing evidencing a side view of the temporary mounting device with strap 10 and securing device 11 attached to round shaped tubing 12 C, along with two existing fishing rod holders 13 A & 13 B.

I claim:

1. A temporary mounting device for temporarily suspending a gadget to a mounting support structure, the temporary mounting device comprising:

an elongated, curved main stem member having a length and being formed from a resilient material, the curved main stem member being curved lengthwise along the length;

two v-mounts formed from a pair of v-mount legs that are joined together at an apex, the two v-mounts being coupled to and longitudinally spaced apart along the length of the main stem member, and wherein the curved main stem member is curved outwardly away from the two v-mounts;

a mounting member extending from at least one of said v-mounts, the mounting member having an attachment element configured to attach the gadget thereto; and a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

2. The temporary mounting device of claim 1, wherein:
the curved main stem member is formed from spring steel having a diameter of from $5/16$ to $3/8$ of an inch.

3. The temporary mounting device of claim 1, wherein:
the curved main stem member has a radius of curvature of from 10 to 26 inches.

4. The temporary mounting device of claim 3, wherein:
the curved main stem member has a length of from 12 to 16 inches.

5. The temporary mounting device of claim 1, wherein:
the v-mount legs of each v-mount are positioned at an angle of less than 90° relative to one another.

6. The temporary mounting device of claim 1, wherein:
the v-mount legs of each v-mount are positioned at an angle of from 65° to 89° relative to one another.

7. The temporary mounting device of claim 1, further comprising:
a strap attachment loop that is coupled to the curved main stem member, the tension strap securing to the curved main stem member through the strap attachment loop.

8. The temporary mounting device of claim 1, wherein:
there is a mounting member extending from each of said v-mounts, the mounting member of each v-mount being a different length from the other.

9. The temporary mounting device of claim 1, wherein:
the v-mounts are attached to the main stem member at an angle of from 91° to 110° relative to the main stem member.

10. The temporary mounting device of claim 1, wherein:
the elongated, curved main stem member is formed from a resilient spring steel material having a diameter of from $5/16$ to $3/8$ of an inch and a length of from 12 to 16 inches; and the two v-mounts are coupled at the apex to opposite ends of the main stem member, the v-mount legs of each v-mount extends from the apex at an angle of less than 90°, and wherein the curved main stem member is curved outwardly away from the two v-mounts along the length of the main stem member, the curved main stem member having a radius of curvature of from 10 to 26 inches.

11. The temporary mounting device of claim 10, wherein: the v-mount legs of each v-mount are positioned at an angle of from 65° to 89° relative to one another.

12. The temporary mounting device of claim 10, further comprising:
the v-mounts are attached to the main stem member at an angle of from 91° to 110° relative to the main stem member.

13. The temporary mounting device of claim 10, wherein: the curved main stem member has a radius of curvature of from 10 to 21 inches.

14. The temporary mounting device of claim 10, wherein: the v-mounts are attached to the main stem member at an angle of from 95° to 105° relative to the main stem member.

15. A temporary mounting device for temporarily suspending a gadget to a mounting support structure, the temporary mounting device comprising:
an elongated, curved, main stem member having a length from 12 to 16 inches, the curved main stem member being curved lengthwise along the length with a radius of curvature of from 10 to 26 inches, the elongated, curved, main stem member being formed from a resilient spring steel material having a diameter of from 5/16 to 3/8 of an inch and a length of from 12 to 16 inches;
two v-mounts formed from a pair of v-mount legs that are joined together at an apex, the two v-mounts being coupled to and longitudinally spaced apart along the length of the main stem member, the v-mount legs of each v-mount being positioned at an angle of from 65° to 89° relative to one another, and wherein the curved main stem member is curved outwardly away from the two v-mounts;
a mounting member extending from at least one of said v-mounts, the mounting member having an attachment element configured to attach the gadget thereto; and
a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

16. The temporary mounting device of claim 15, wherein: the v-mounts are attached to the main stem member at an angle of from 91° to 110° relative to the main stem member.

17. The temporary mounting device of claim 15, wherein: the v-mounts are attached to the main stem member at an angle of from 95° to 105° relative to the main stem member.

18. The temporary mounting device of claim 15, wherein: the curved main stem member has a radius of curvature of from 10 to 21 inches.

19. A temporary mounting device for temporarily suspending a gadget to a mounting support structure, the temporary mounting device comprising:
an elongated, curved, main stem member having a length from 12 to 16 inches, the curved main stem member being curved lengthwise along the length with a radius of curvature of from 10 to 26 inches, the elongated, curved, main stem member being formed from a resilient spring steel material having a diameter of from 5/16 to 3/8 of an inch and a length of from 12 to 16 inches;
two v-mounts formed from a pair of v-mount legs that are joined together at an apex, the two v-mounts being coupled to and longitudinally spaced apart along the length of the main stem member, the v-mount legs of each v-mount being positioned at an angle of from 65° to 89° relative to one another, the v-mounts being attached to the main stem member at an angle of from 91° to 110° relative to the main stem member, and wherein the curved main stem member is curved outwardly away from the two v-mounts;
a mounting member extending from at least one of said v-mounts, the mounting member having an attachment element configured to attach the gadget thereto; and
a selectively releasable tension strap that releasably secures to the curved main stem member at a position along the length of the curved main stem member between the v-mounts and that is configured to be secured around the mounting support structure for securing the temporary mounting device to said support structure when the temporary mounting device is in a mounted configuration, the v-mounts being configured to engage a surface or surfaces of the mounting structure when the temporary mounting device is in said mounted configuration, and wherein the curved main stem member provides an outward biasing force when the tension strap is secured around the support structure to produce tension on the tension strap when in the mounted configuration.

20. The temporary mounting device of claim 19, wherein: the v-mounts are attached to the main stem member at an angle of from 95° to 105° relative to the main stem member.

\* \* \* \* \*